(12) United States Patent
Cohn et al.

(10) Patent No.: US 11,062,323 B2
(45) Date of Patent: Jul. 13, 2021

(54) MANAGING COMPONENT OWNERSHIP INFORMATION ACROSS A CORRESPONDING LIFE CYCLE

(71) Applicant: International Business Machines Corporation, Armonk, NY (US)

(72) Inventors: John M. Cohn, Richmond, VT (US); Shahrokh Daijavad, Morgan Hill, CA (US); Nirmit V. Desai, Yorktown Heights, NY (US); Martin G. Kienzle, Ossining, NY (US); Dinesh Verma, New Castle, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 107 days.

(21) Appl. No.: 14/984,070

(22) Filed: Dec. 30, 2015

(65) Prior Publication Data

US 2017/0193520 A1 Jul. 6, 2017

(51) Int. Cl.
  *G06Q 30/00* (2012.01)
  *H04W 12/06* (2021.01)
  *H04W 4/70* (2018.01)
  *H04L 29/08* (2006.01)

(52) U.S. Cl.
  CPC ........... *G06Q 30/012* (2013.01); *H04L 67/12* (2013.01); *H04W 4/70* (2018.02); *H04W 12/06* (2013.01)

(58) Field of Classification Search
  USPC ....................................................... 705/318
  See application file for complete search history.

(56) References Cited

U.S. PATENT DOCUMENTS

| 5,918,214 A | 6/1999 | Perkowski |
| 5,987,474 A | 11/1999 | Sandifer |
| 5,999,812 A * | 12/1999 | Himsworth ........... H04W 12/06 455/411 |
| 7,878,416 B2 | 2/2011 | Lapstun et al. |
| 2003/0004887 A1 * | 1/2003 | Roszak ............. G06Q 20/4097 705/57 |
| 2003/0061104 A1 | 3/2003 | Thomson et al. |

(Continued)

FOREIGN PATENT DOCUMENTS

WO  WO-2015070055 A2 *  5/2015 ......... G06K 19/0723

OTHER PUBLICATIONS

S. M. Filho, L. E. C. Leite, G. Lemos and S. Meira, "FLEXCM—A Component Model for Adaptive Embedded Systems," 31st Annual International Computer Software and Applications Conference (COMPSAC 2007), Beijing, China, 2007, pp. 119-126, doi: 10.1109/COMPSAC.2007.116. (Year: 2007).*

(Continued)

*Primary Examiner* — Michael Young
(74) *Attorney, Agent, or Firm* — Cantor Colburn LLP; Vazken Alexanian

(57) ABSTRACT

According to an embodiment, a method for registering a component is provided. The method includes receiving a request for registration of the component. The method also includes acquiring registration information of the component in response to the request by communicating directly with the component and exacting the registration information and modifying a registration entry associated with the component in a registration database according to the registration information.

2 Claims, 7 Drawing Sheets

Environment 400

(56) References Cited

U.S. PATENT DOCUMENTS

| | | | |
|---|---|---|---|
| 2005/0015273 A1 | 1/2005 | Iyer | |
| 2005/0033729 A1* | 2/2005 | Feinleib | G06F 9/44505 |
| 2009/0041005 A1* | 2/2009 | Chen | H04L 65/1073 |
| | | | 370/352 |
| 2009/0287498 A2* | 11/2009 | Choi | G06Q 30/02 |
| | | | 705/1.1 |
| 2011/0113068 A1* | 5/2011 | Ouyang | H04L 63/0815 |
| | | | 707/784 |
| 2015/0134552 A1* | 5/2015 | Engels | G06Q 30/0185 |
| | | | 705/318 |
| 2015/0319511 A1* | 11/2015 | Droste | H04Q 9/00 |
| | | | 340/870.07 |
| 2016/0262190 A1* | 9/2016 | Bitar | H04W 76/12 |

OTHER PUBLICATIONS

Alistair, Duke, et al.; "WP 8: B2B in Telecommunications Case Study D8. 2 Platform Requirements Specification." Data, Information and Process Integration with Semantic Web Services Apr. 15, 2015; pp. 81.

Ion Stefan Sacala et al., "Towards the development of the future internet based enterprise in the context of cyber-physical systems." Control Systems and Computer Science (CSCS), 2013 19th International Conference on. IEEE, 2013; pp. 8.

\* cited by examiner

Directed Graph 500

MANAGING COMPONENT OWNERSHIP INFORMATION ACROSS A CORRESPONDING LIFE CYCLE

BACKGROUND

The present disclosure relates to generally managing component ownership information across a corresponding life cycle.

The Internet of Things (IoT) is the network of physical objects or "things" embedded with electronics, chips, software, sensors, and network connectivity (e.g., components), which enables these objects to collect and exchange data. As IoT systems become popular, the makers of various components related to IoTs can benefit from having a registry of component ownership and associated information about component operation. Current implementations of such registries are geared towards automatically collecting this information in a single registry of a component manufacturer, who uses the collected information for diagnostics of the component.

However, the current implementations pose a challenge for containing registration information for many component users who do not directly sell components to the end-user of these components. For instance, users may not want to go to the component maker for registration, since the end product may include many different components. In addition, current registry systems are geared towards registration of a product sold directly to end user, and are not able to collect registration information for components that are embedded within this product. Such components may go through a sequence of being embedded into larger components which eventually become part of the final product. As a result, current registry systems become ineffective for its desired functions of components that are embedded within other components.

SUMMARY

According to an embodiment, a method for registering a component is provided. The method includes receiving a request for registration of the component. The method also includes acquiring registration information of the component in response to the request by communicating directly with the component and exacting the registration information and modifying a registration entry associated with the component in a registration database according to the registration information. According to other embodiments, the method can be implemented in a system and/or computer program product.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
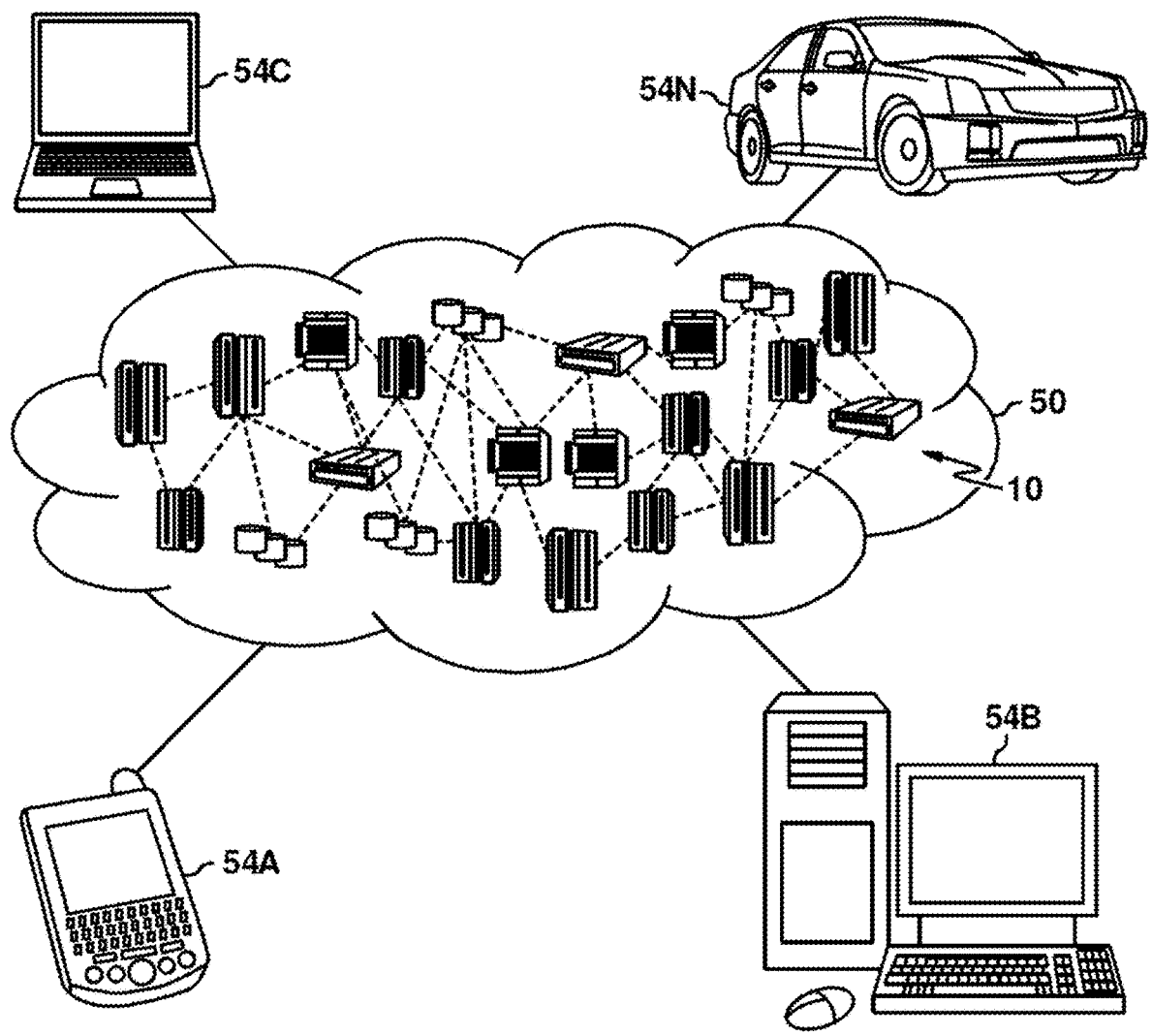
FIG. 1 depicts a cloud computing environment according to an embodiment of the present invention.

In view of the above, provided herein is a mechanism for transferring registration of a component as the component proceeds through its life-cycle stages. Generally, embodiments herein relate to a system, a method, and/or a computer program production that maintain registries for different owners of a component. The registries can communicate registration information as the component changes ownership changes according to predefined relationships between the owners. The registries can employ a single request operation to identify the registration information across all life-cycle stages.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
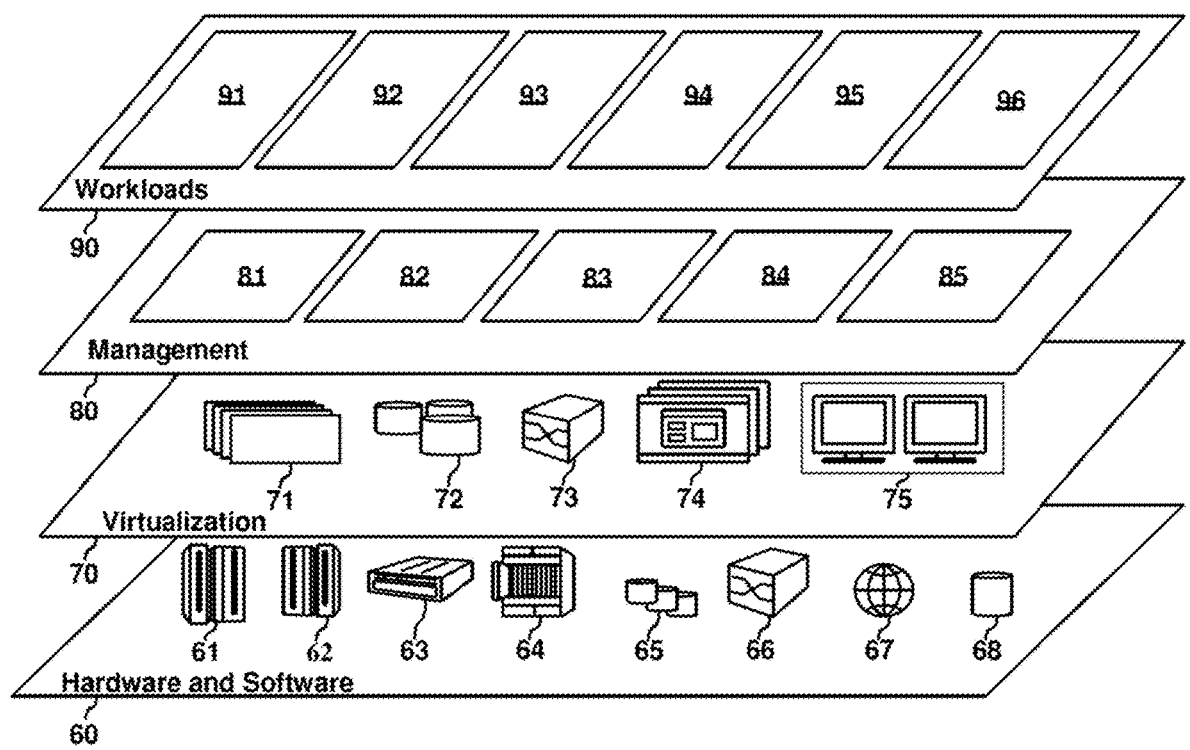
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

It is understood in advance that although this disclosure includes a detailed description of IoT delivered in a cloud computing environment, implementation of the teachings recited herein are not limited to a cloud computing environment. Rather, embodiments of the present invention are capable of being implemented in conjunction with any other type of computing environment for IoT now known or later developed.

IoT delivered via a cloud computing is an infrastructure comprising a network of interconnected nodes.

Figure 3:
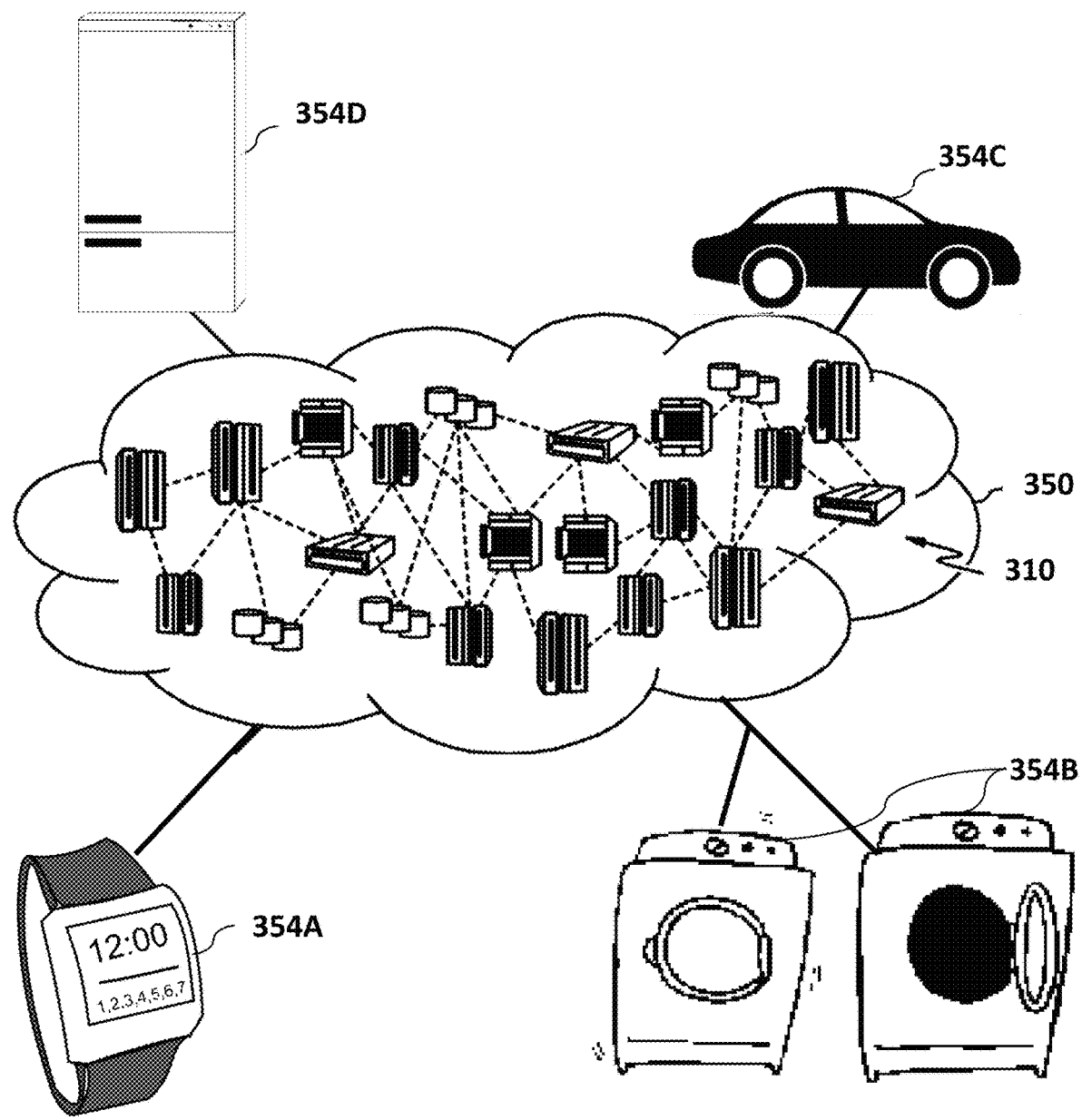
FIG. 3 depicts an IoT delivered from cloud environment according to an embodiment of the present invention.

Referring now to FIG. 3, illustrative IoT delivered via a cloud computing environment 350 is depicted. As shown, this environment 350 comprises one or more cloud computing nodes 310 with which local computing devices embedded in Internet of Things, such as, for example, a smart watch 354A, a smart washer/dryer combination 354B, a refrigerator 354C, and/or automobile computer system 354N may communicate. Nodes 310 may communicate with one another. They may be grouped (not shown) physically or virtually, in one or more networks, such as via the public Internet, a private Intranet, a home computer network, or a combination thereof. The nodes 310 may offer a variety of services for use by the different computing devices 354A-N which may include functions such as registration, data cleaning, or data storage. It is understood that the types of computing devices 354A-N shown in FIG. 3 are intended to be illustrative only and that computing nodes 310 and cloud computing environment 350 can communicate with any type of computerized device over any type of network and/or network addressable connection (e.g., using a web browser).

Figure 4:
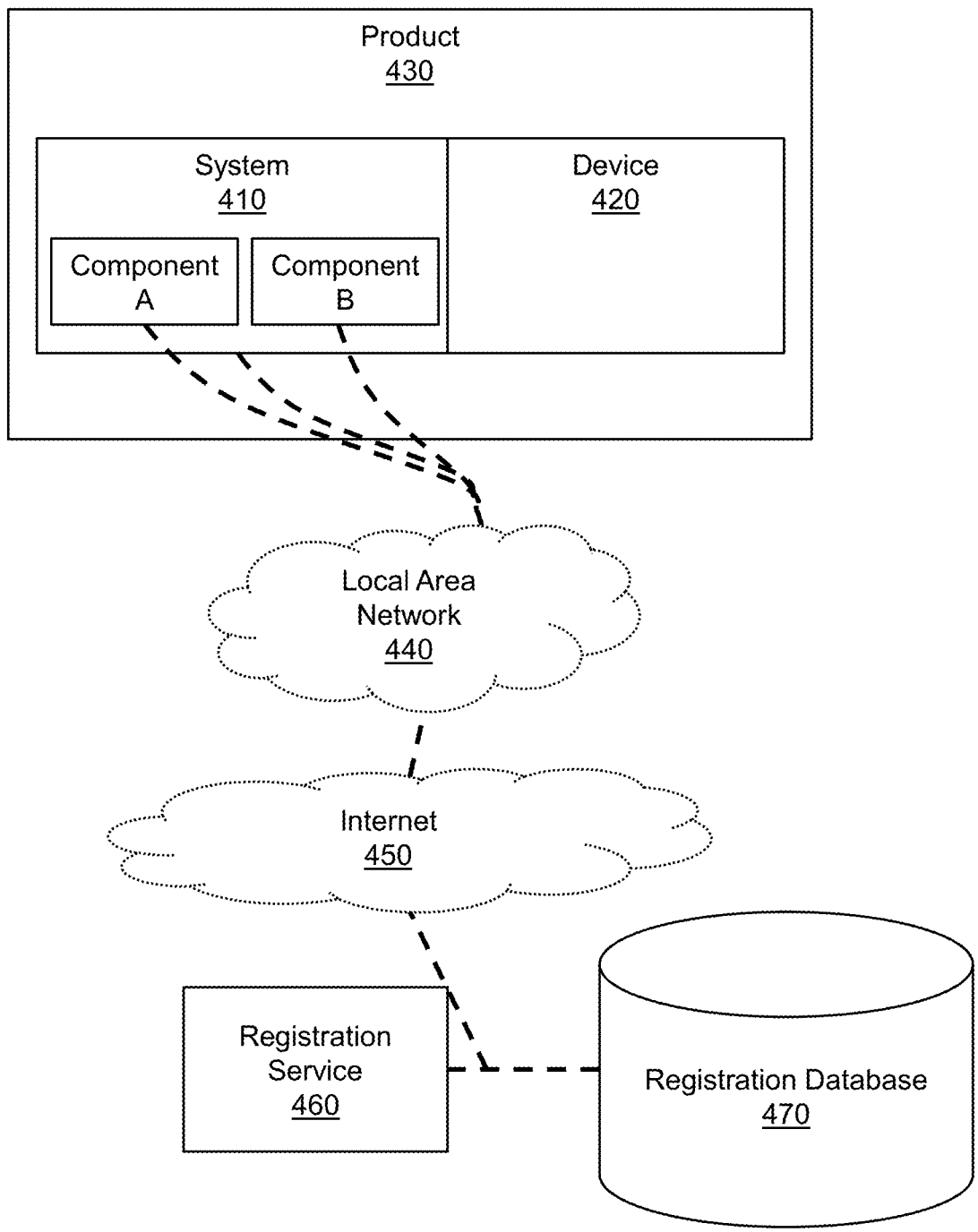
FIG. 4 depicts an environment for managing component ownership information in accordance with an embodiment.

Turning now to FIG. 4, an environment 400 for managing component ownership information is generally shown in accordance with an embodiment. FIG. 4 includes components A-B, a system 410, a device 420, a product 430, a local area network 440, an internet 450, a registration service 460, and a registration database 470.

The components A-B, the system 410, the device 420, and the product 430 are the "things" of the Internet of Things (IoT) across the environment 400. The components A-B themselves can be any hardware and/or software, such as a controller, a chip, a sensor, a network device, etc. or any combination thereof, that are sold or change ownership between entities as a single unit. The components A-B can be considered base-tier components. A base-tier component is an original hardware and/or software that can be nesting into a next-tier component.

The system 410 can be any component that includes other components such as hardware and/or software, such as a controller, a chip, a sensor, a network device, etc. or any combination thereof. In an embodiment, the system 410 can be a next-tier component that embeds and operates, manages, and controls the components A-B. An entity can take ownership of the components A-B, the components A-B in another larger component (e.g., the system 410), or resell any combination of the components A-B and the system 410 to another entity. An entity could be an individual, a business, a corporation, a government agency, etc. or a combination thereof which creates, modifies, buys, sells, resells or owns components, or combinations of components.

In general, the components A-B and the system 410 can also implement a collection service, which can be hardware, software, or combination thereof, to gather registration information. For example, components may have the ability to collect the information while others may not. Different types of collection mechanisms to collect information include, but are not limited to, collecting information by reading a bar-code to collect serial number information of a component, reading another type of code (e.g., such as a quick response code to collect information about a component), reading the information in a non-volatile storage area of an electronic component to collect information, prompting a user to enter in registration information using a display embedded in system 410, providing a user with an application of a smartphone to enter registration information etc. The registration information can include, but is not limited to, internet protocol addresses, domain names, serial numbers, media access control address, identifiers, a set of variables indicating operations of the components A-B and the system 410, attributes of the components A-B and the system 410, etc. Further, registration information can include a unique identifier for each individually and/or the combination of the components A-B and the system 410, plus any other information, such as its location, status, etc. The components A-B and the system 410 can include network capabilities, such that each can communicate amongst each other or to any external components/systems (e.g., the registration service 460 and the registration database 470). The components A-B and the system 410 can also communicate, e.g., the registration information, to any external components/systems individually or on behalf of one another.

The device 420 can be an upper-tier component or system that includes hardware and/or software and that receives the system 410. The product 430 can be a top-tier component or system that includes hardware and/or software and that receives the device 420. The product 430 can be can final product, which is utilized by a client. A client can be an entity who is not going to embed into the final product and/or further component. The network 440 and the internet 450 can be any communication structure (as described above) capable of supporting communication between the elements of the environment. The interconnections of the environment 400, which are represented by the dashed-lines, can be supported by network interfaces of the elements of the environment 400 or by network interfaces available via some other mechanism present in the environment 400.

The registration service 460 can be a computing device, component, or system that includes hardware and/or software capable of performing registration operations. The registration service 460 could run in a cloud computing environment as described earlier. Due to the connectivity of the environment 400, the registration operation can procure the registration information directly, or through the above noted collection services, from the components A-B and the system 410 (and the environment 400). In turn, the Components A-B can be configured to communicate to registration service 460 and provide the registration information (e.g., the registration service 460 can be invoked by any component A-b of the environment 400 that has a processor capable of running software and has a way to interconnect to the registration service 460). The registration database 470 can be a computing device, component, or system that includes hardware and/or software capable of storing, maintaining, and communication the registration information. The registration service 460 and the registration database 470 are representative within the environment, as these elements can indicate one or more of the same. In order to determine which component will communicate to the registration service, one or more of the components can maintain information about component ownership as described further in FIG. 5.

Figure 5:
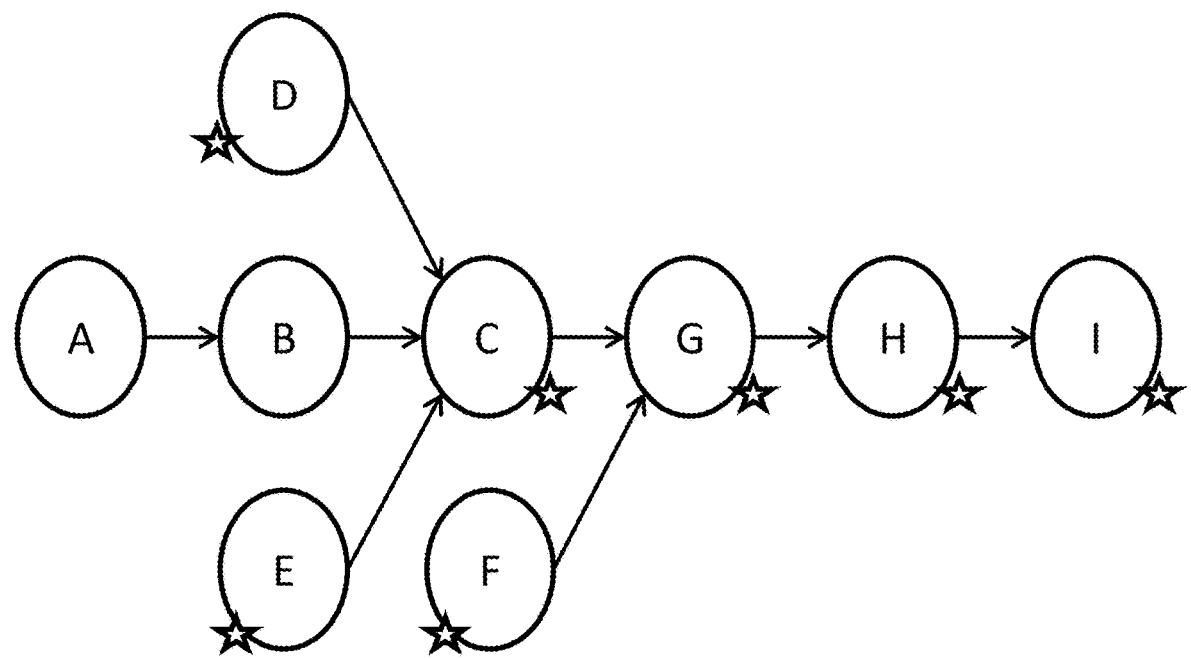
FIG. 5 depicts a directed graph illustrating component ownership in accordance with an embodiment.

Turning now to FIG. 5, a directed graph 500 illustrating component ownership is depicted in accordance with an embodiment. The directed graph 500 models life-cycle changes of the components A-B, the system 410, the device 420, and the product 430. Each Node A-I in the directed graph 500 represents a life-cycle stage. A life-cycle stage is a combination of at least one component and an entity, such that each entity associated with the node is in ownership of the at least one component. In one embodiment, a life-cycle of a component is a sequence of ownerships that the component goes through (e.g., may be referred to as an ownership graph). An ownership graph can indicate components about whose registration information ought to be collected and about which ownership information need not be collected. The ownership graph can be maintained by any component, such as the electronic controller or any of the other components described in FIG. 3.

In the directed graph 500, each arrow indicates a change of ownership to another entity. Each arrow can also indicate an embedding of a component from a previous node into an upper level product (e.g., a change is state). Each Node A-I can an implementation of the collection service that collects the registration information of that node. Each arrow can further indicate a passing of registration information upstream along the direct graph 500. In this way, the collection services can support the registration operation at any stage along the directed graph 500. Also, in the directed graph 500, the leading of multiple arrows into a node (e.g., as shown for Node C) represents a combining of downstream components and information at the upstream node (e.g., the Node C receives and includes all components and registration information from Nodes B, D, E). Note that, in the directed graph 500, some of the Nodes A-I includes components that are capable of registration and these nodes can be referred to as registration nodes. The registration nodes are indicated with a star.

Figure 6:
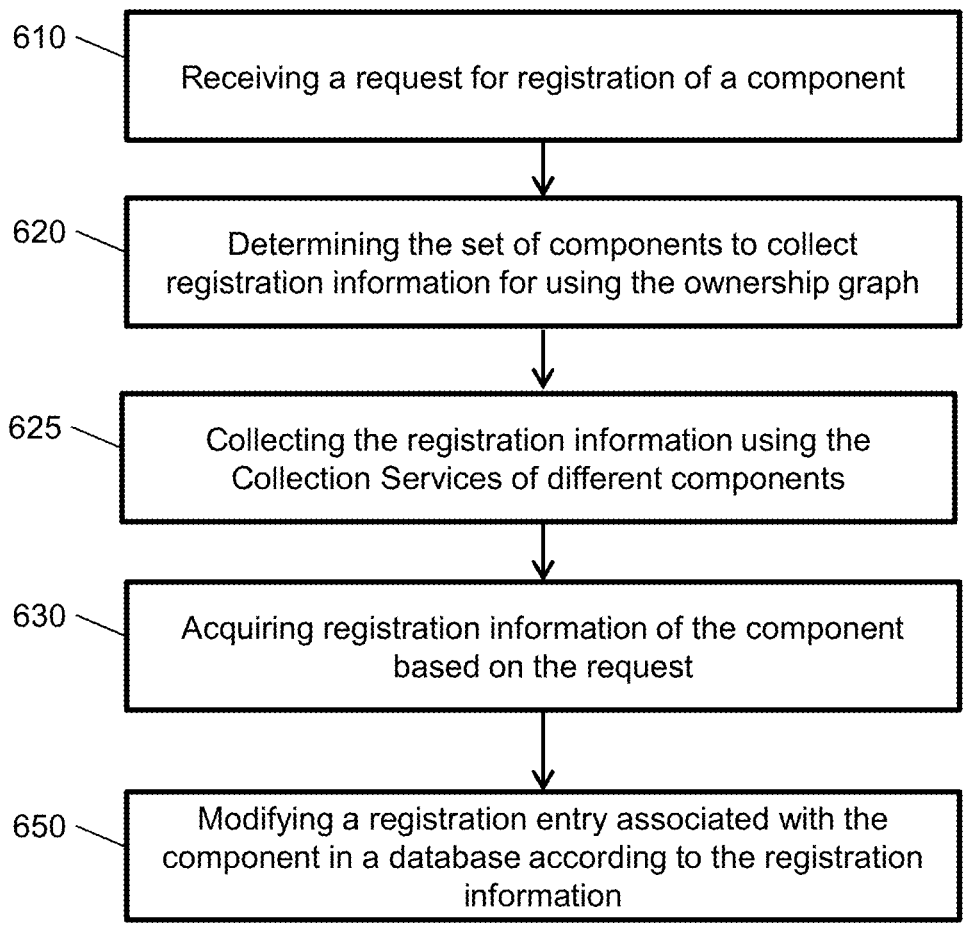
FIG. 6 depicts a process flow for managing component ownership information in accordance with an embodiment.
Figure 7:
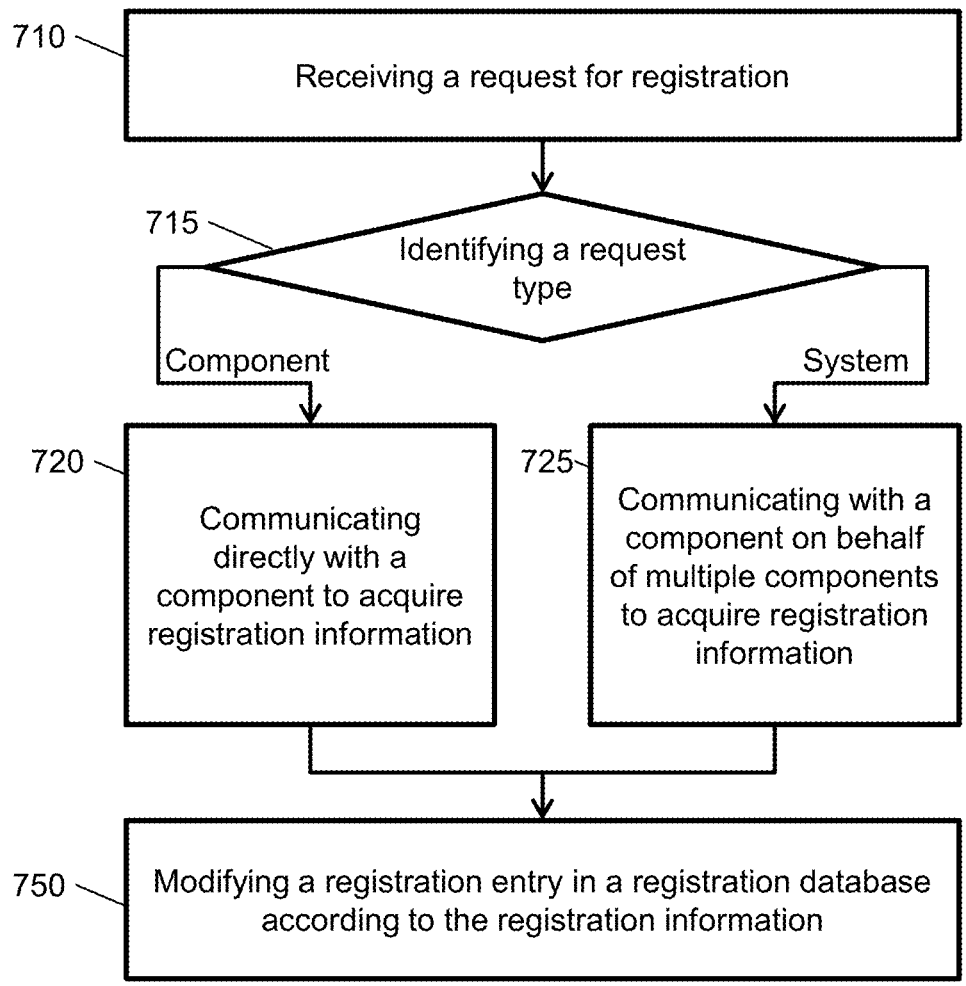
FIG. 7 depicts another process flow for managing component ownership information in accordance with an embodiment.

An example of building a combination washer/dryer will now be described with respect to FIGS. 6-7. In this example, the component A can be an electronic controller; the component B can be a power stabilizer; the system 410 can be an embedded processor; the device 420 can be a washer; and the product can be the combination washer/dryer. The washer can further include a chassis and other components that are mechanical and do not include electrical communicative abilities.

At Node A, the chassis for the washer (device 420) is manufactured by a first company (entity $E_A$). The chassis is provided to second company (entity $E_B$), who white-labels the chassis at Node B. Entity $E_B$ can then resells the white-labeled chassis to other companies, such as a third company (entity $E_C$). In addition to receiving the chassis from entity $E_B$, entity $E_C$ receives the electronic controller (component A) from a forth company (entity $E_D$) represented by Node D and the power stabilizer (component B) from a fifth company (entity $E_E$) represented by Node E. Entity $E_C$ at Node C assembles washer (device 420), which at this stage does not include the embedded processor (the system 410). The electronic controller and the power stabilizer are capable of automatically performing the collection service and supporting the registration operation individually, on behalf of each other, on behalf of the chassis, and/or on behalf of the assembled washer. Thus, the collection service and the registration operation can be performed by the electronic controller and the power stabilizer at Nodes D and E at any time or at Node C once the washer is assembled.

Entity $E_C$ can supply the washer to sixth company (entity $E_G$), which makes a combination washer/dryer at Node G. To make the combination washer/dryer, the entity $E_G$ also obtains a dryer from a seventh company (entity $E_F$) at Node F. The dryer also has the embedded processor that is capable of performing registration through the environment 400 (as indicated by the star). The embedded processor is configured to receive and operate the electronic controller and the power stabilizer. The combination washer/dryer can be sold by entity $E_G$ to a wholesaler (entity $E_H$) at Node H. The entity $E_H$ can then provide the combination washer/dryer to a retailer (entity $E_I$) at Node I. Clients, in turn, can buy the combination washer/dryer from the entity $E_I$ and put the combination washer/dryer in a home (e.g., in a network 440).

An example of a registration operation at Node D will now be described with respect to a production of the washer/dryer combination in view of FIG. 6. FIG. 6 depicts a process flow 600 for managing ownership information of the electronic controller in accordance with an embodiment. The process flow 600 begins at block 610, where the registration service 460 and the electronic controller communicate a request for registration of the electronic controller. The request can be initiated from the electronic controller or by the registration service 460. In one embodiment, the electronic controller can initiate the request when it is powered on in an installation. In another embodiment, the electronic controller can simply connect with the registration service when it is powered on, and the registration service initiates the registration request after consulting the ownership graph as described in FIG. 5.

At block 620, the registration service 460 determines a set of components to collect registration information for using the ownership graph. For example, the electronic controller doing registration can consult an ownership graph to determine the set of components about which registration information that needs to be sent to the registration service 460. In alternate embodiments, the ownership information may be maintained by the registration service 460 which instructs the electronic controller of the components about whose the registration information needs to be collected. In other embodiments, a set of predefined software programs, or a set of external business rules may be used to determine the set of components about whom ownership information ought to be collected.

At block 625, the registration service 460 acquires registration information by using collection services of different component. For example, the electronic controller obtains the registration information using an included collection service or using a collection service provided by another component. Such registration information contains details of different component whose registration information can be sent to the registration service. The registration information of one component may include information from the registration information of another component. For instance, a name of an owner and a location of installation can be determined for each component from the information for the overall product in which the components are included. The electronic controller uses a life ownership graph to determine the types of registration information that should be copied from one component to another. It can do so using a variety of mechanisms, including but not limited to copying attributes like location information from one component to another, using a set of business rules to determine how to combine registration information, using an embedded software program to combine the registration information in a pre-programmed manner, etc.

At block 630, the registration service 460 acquires registration information of the electronic controller in response to the request received in of block 610. To acquire the registration information, the registration service 460 can communicate directly with the electronic controller through the interconnection of the environment 400. At block 650, the registration service 460 adds a registration entry for the electronic controller in the registration database 340 according to the registration information.

In view of the above, the registration operation can implement throughout the life-cycle of the washer, when the capability of registration is available to any of the entities at a particular Node A-I. For example, at any stage, the registration of a top level component is the only one that performs the registration operation, and is responsible for relaying the registration information about the other embedded components. In turn, relationships between the entities and the components can be maintained on a bilateral basis, and policy restrictions on sharing registration information can be enforced by the registration service 460 and the registration database 440. Further, if a component configuration cannot be changed by an upper-tier component, a redirection/rewrite option can be provided at the upper component, or other remedial action taken.

In an embodiment, the registration service 460 can be a plurality of registries, each of which can correspond to the entities of the Nodes A-I (or life-cycle stages). These different registries can be physically distinct, or be physically one with logical distinctions. Management of plurality of registries will be described.

In an example scenario, a first component can be a chip. The chip can be manufactured by a chip maker, which reflects a first life-cycle stage of the chip. The chip can then be embedded into a second component, such as a network card produced by a card manufacturer. This embedding into the second component reflects a second life-cycle stage of the chip. The chip is a base-tier component, and the card is an upper-tier component or second-level product.

The network card can be embedded into a third component, such as a system (e.g., a motherboard) by a system manufacturer, which reflects a third life-cycle stage of the chip. The system can then be further embedded into a forth component, such as a device (e.g., a computer) by a device marker, which reflects a fourth life-cycle stage of the chip. The system is an upper-tier component or third-level product, and the device is an upper-tier component or top-level product.

In this way, the ownership of the chip moves from the chip maker (e.g., a first entity) to the card manufacturer (e.g., a second entity) to the system manufacturer (e.g., a third entity) to the device maker (e.g., a fourth entity). Each entity can include a corresponding registry for collecting and managing the registration information of all the components at a particular life-cycle stage. Each entity can then register all the components at a particular life-cycle stage (according to the process flow 400) with their corresponding registry as the chip moves into their ownership.

In another example scenario, a life-cycle change can occur with respect to a processor that is incorporated into a smart graphics card, which is incorporated into a music system or a GPS system that is incorporated into a car. The ownership of the processor moves from a processor manufacturer (e.g., a first entity) to a smart graphics card manufacturer (e.g., a second entity) to a marker of the music system/GPS system (e.g., a third entity) to a car manufacturer (e.g., a fourth entity). Each entity can include a corresponding registry for collecting and managing the registration information of all the components at a particular life-cycle stage. Each entity can then register all the components at a particular life-cycle stage (according to the process flows herein) with their corresponding registry as the chip moves into their ownership.

In the above example scenarios, the registration operations can be performed at the particular life-cycle stage to provide registration information to the registries of the entities. The registration information can be marked by a unique identifier that is specific to the components, the entities, etc. The registration operation can provide the registration information via a single registration request. In an embodiment, the single registration request is invoked by the highest-tiered component at a particular life-cycle stage.

For example, when the product 430 (e.g., the combination washer/dryer, the computer, the car) is procured by a client and connected to a network 440, the registration operation can be performed for all components of the product 430 by the product 430 itself. In another example, after the combination washer/dryer is by entity $E_G$, the embedded processor can perform the registration operation (e.g., if there is network 440 access at Node G) as this is the highest-tier components.

In another example, after the washer is assembled by entity $E_C$, either the electronic controller or the power stabilizer can perform the registration operation (e.g., if there is network 440 access at Node C) as these components are on the same tier. In addition, the registration information collected at Node C by the collection service can be based on predefined relationships between the entities $E_B$ through $E_G$. For instance, the predefined relationship can be based on a determination by entity $E_C$ as to whether entity $E_C$ will provide any registration information to entity $E_G$. If registration information is provided, $E_C$ can determine as to what will be the granularity of registration information provided (i.e. per component UUDI, on a group, aggregate only, etc.). $E_C$ can also determine as to what is the registration information that will be reported back from entity $E_B$ to entity $E_A$ (e.g., identity of entity $E_G$, diagnostic information, location, etc.).

The predefined relationship can be embodied in a hardware or software of any component. In this way, while a component may be capable of communicating registration information to a corresponding registry, a current owner of that component may not want to share registration information (e.g., the owner of the components may or may not want to have corresponding registration information go to previous owners), as sharing registration information may violate some regulation or credential set by the current owner.

Additional issues can also arise when bootstrapping components to establish network connectivity to a corresponding registration service, as registries can become conflicted with having several owners trying to manage registration information concurrently. For example, the chip may be hard-configured with an internet protocol address or domain name that goes to the registration service of the chip maker and thus subsequent entities may be forced to connect to the registration service of the chip maker (e.g., the chip is configured to allow communication only to the chip maker).

To address the above, an embodiment utilizing one registration request to account for all of the components will now be described with respect to FIG. 7. FIG. 7 depicts another process flow 700 for managing component ownership information across a corresponding life cycle in accordance with an embodiment. In the below description, references may be made to the above FIG. 7 and embodiments for illustrative purposes.

The process flow 700 begins at block 710, where a registry receives a request for registration. If the life-cycle stage of the washer/dryer combination is at Node G, this request can be the one registration request effective for the components A-B (the electronic controller and the power stabilizer) and the system 330 (the embedded processor). The request can be initiated from the embedded processor. The request can indicate a request type, such as component request or system request.

A component request is a request by a base-tier component or by an upper-tier component that does not currently incorporate other components. The component request can identify the electronic controller or the power stabilizer. The component request can also identify the embedded system independent of the electronic controller and the power stabilizer.

A system request is a request on behalf of multiple components by an upper-tier component. The system request can identify the embedded processor (e.g., an upper level product) on behalf of as least one of the electronic controller and the power stabilizer.

At block 715, the registry identifies the request type of the request. If the request type is the component request, then the process flow 700 proceeds to block 720. If the request type is a system request, then the process flow 700 proceeds to block 725.

At block 720, the registry acquires registration information by communicating directly with a component, such as only communicating with the embedded processor.

At block 725, the registry acquires registration information by communicating directly with a component on behalf of all components. For example, the registry can communicate with the embedded processor and receive registration information for the electronic controller, the power stabilizer, and/or the embedded processor.

In this way, when the registry communicates with the embedded processor, the registration information of the electronic controller and the power stabilizer can be protected according to the predefined relationships between the owners/entities of these components (e.g., only the needed registration information is extracted without extracting proprietary information other components to maintain the security of these other components).

At block 750, the registry modifies a registration entry in the registration database 340 according to the registration information.

In an embodiment, when a component is capable of registration, that component can be configured with an address of a registration service. The registration service address can be determined by a business relationship between the different entities. When the component registers with that registration service, the registration information can be then relayed either forward or reverse (or both) along the life-cycle stages that re maintained by the registration service (e.g., sent to entities corresponding to previous or subsequent nodes). The registration information that is passed can then be selected by the registration service on the basis of an agreement between the links of the life-cycle.

Further, on registration time, a device including the component can be instructed on where to send different information that is available in the device to different services. The different information can be either relayed by the registration service to other services, or the device may be redirected to provide some information to a different site. This different site can be a different registration service or a different site dedicated to collection information (e.g. diagnostic information from a component).

Furthermore, when the final product that contains the component is installed in the user premises, the final product can contact the registration service designated by the final life-cycle stage. The component can be configured, prior to the installation within the final product, the identity of this service. The registration service then passes the registration information along the segment of the life-cycle stages as needed.

Technical effects and benefits include maintaining registration as a component progresses through life-cycle stages. For example, by receiving the registration information, the registration service 460 and the registration database 470 in turn can provide the technical effects and benefits automating information about a components/cards/systems/etc., tracking warranty information, collecting statistics about usage, and performing diagnostics. Thus, embodiments described herein are necessarily rooted in computing environment to perform proactive operations to overcome problems specifically arising in the realm of registering components.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for registering a plurality of components of an appliance or automobile computer system, the plurality of components comprising an embedded processor as an upper-level component and one or more lower-level components included within the upper-level component, the method comprising:

receiving, by a first registration service of a plurality of services, a request for registration of the embedded processor and the one or more lower-level components, wherein the request is initiated by the embedded processor being preconfigured to send different available registration information to different services of the plurality of services, wherein the registration information comprises internet protocol addresses, domain names, serial numbers, media access control address, identifiers, a set of variables indicating operations of the plurality of components and the appliance or the automobile computer system, and attributes of the plurality of components and the appliance or the automobile computer system, wherein the one or more lower-level components comprise a controller and a power stabilizer, wherein the request is based on a preconfiguration of the embedded processor comprising an address of the first registration service after a collection service of the embedded processor accumulates first and second registration information;

identifying a request type of the request for registration, wherein the request type is one of a component type and a system type;

acquiring, by the first registration service, the first registration information of the embedded processor and the one or more lower-level components in response to the request by communicating directly with a network interface of the embedded processor and extracting the first registration information directly from the one or more lower-level components if the request type is a component type and directly from the one or more lower-level components on behalf of multiple lower-level components if the request type is a system type, wherein the registration information comprises a unique identifier of the embedded processor, wherein the extracting of the first registration information comprises only extracting a needed portion of the first registration information without extracting proprietary information of the one or more lower-level components to maintain a security of the one or more lower-level components;

sending, by the network interface of the embedded processor to a second registration service of the plurality of services, the second registration information of the embedded processor and the one or more lower-level components based on the preconfiguration of the embedded processor comprising an address of the second registration service, the second registration information being different from the first registration information;

modifying, by the first registration service, a registration entry associated with the embedded processor in a registration database according to the first registration information; and passing, by the first registration service, the first registration information of the embedded processor to a third registration service of the plurality of services that is different from the first registration service and at a different site dedicated to collection information, wherein the passing of the first registration information comprises passing selected portions of the first registration information on a basis of an agreement, wherein an ownership life-cycle is maintained in the embedded processor and a representation of the ownership life-cycle of a plurality of components is maintained in the first registration service.

2. A computer program product, the computer program product comprising a non-transitory computer readable storage medium having program instructions for registering a plurality of components of an appliance or automobile computer system, the plurality of components comprising an embedded processor as an upper-level component and one or more lower-level components included within the upper-level component, the program instructions executable by processors of a plurality of services to cause:

receiving, by a first registration service of the plurality of services, a request for registration of the embedded processor and the one or more lower-level components, wherein the request is initiated by the embedded processor being preconfigured to send different available registration information to different services of the plurality of services, wherein the registration information comprises internet protocol addresses, domain names, serial numbers, media access control address, identifiers, a set of variables indicating operations of the plurality of components and the appliance or the automobile computer system, and attributes of the plurality of components and the appliance or the automobile computer system, wherein the one or more lower-level components comprise a controller and a power stabilizer, wherein the request is based on a preconfiguration of the embedded processor comprising an address of the first registration service after a collection service of the embedded processor accumulates first and second registration information;

identifying a request type of the request for registration, wherein the request type is one of a component type and a system type;

acquiring, by the first registration service, the first registration information of the embedded processor and the one or more lower-level components in response to the request by communicating directly with a network interface of the embedded processor and extracting the first registration information directly from the one or more lower-level components if the request type is a component type and directly from the one or more lower-level components on behalf of multiple lower-level components if the request type is a system type, wherein the registration information comprises a unique identifier of the embedded processor, wherein the extracting of the first registration information comprises only extracting a needed portion of the first registration information without extracting proprietary information of the one or more lower-level components to maintain a security of the one or more lower-level components;

sending, by the network interface of the embedded processor to a second registration service of the plurality of services, the second registration information of the embedded processor and the one or more lower-level components based on the preconfiguration of the embedded processor comprising an address of the second registration service, the second registration information being different from the first registration information;

modifying, by the first registration service, a registration entry associated with the embedded processor in a registration database according to the first registration information; and passing, by the first registration service, the first registration information of the embedded processor to a third registration service of the plurality of services that is different from the first registration service and at a different site dedicated to collection information, wherein the passing of the first registration information comprises passing selected portions of the first registration information on a basis of an agreement, wherein an ownership life-cycle is maintained in the embedded processor and a representation of the ownership life-cycle of a plurality of components is maintained in the first registration service.

* * * * *